United States Patent [19]

Oberle

[11] Patent Number: 4,976,902
[45] Date of Patent: Dec. 11, 1990

[54] MOLDING METHOD FOR PRODUCING EXPANDED POLYOLEFIN FOAM

[75] Inventor: William L. Oberle, Goode, Va.
[73] Assignee: Rubatex Corporation, Bedford, Va.
[21] Appl. No.: 253,250
[22] Filed: Oct. 4, 1988
[51] Int. Cl.$^5$ ............................................. B29C 67/22
[52] U.S. Cl. ........................................ 264/54; 264/51; 264/55; 264/320; 264/DIG. 18
[58] Field of Search .................. 264/54, DIG. 18, 51, 264/320, 55

[56] References Cited

U.S. PATENT DOCUMENTS

| | | | |
|---|---|---|---|
| 2,291,213 | 7/1942 | Cuthbertson | 264/54 X |
| 3,071,814 | 1/1963 | Guggenheim | 264/320 |
| 3,098,832 | 7/1963 | Pooley et al. | 264/54 X |
| 3,818,085 | 6/1974 | Marsland, Jr. et al. | 264/55 |
| 3,818,086 | 6/1974 | Stastny et al. | 264/45.2 X |
| 4,559,190 | 12/1985 | Quintavalle et al. | 264/45.3 |
| 4,596,684 | 6/1986 | Kumasaka et al. | 264/54 |
| 4,671,910 | 6/1987 | Fuhrmann | 264/DIG. 18 |

Primary Examiner—Jan H. Silbaugh
Assistant Examiner—Allan R. Kuhns

[57] ABSTRACT

An expanded polyolefin foam with uniform fine closed cells is produced by placing a pre-form of a heat-expandable polyolefin resin composition in a mold cavity of generally uniform depth and closed by a platen, heating the mold to a temperature above the blow activation temperature of the pre-form while constraining the pre-form against any expansion under heavy controlled pressure, and then after cooling of the thus treated pre-form, removing the same from the mold and heating to effect expansion thereof. The pre-form is in a solid form with a volume exceeding the volume of the mold by a controlled amount in the range of 0.1-1 percent. The area of the pre-form is such as to fit readily within the mold cavity and its thickness exceeds the mold depth so that as the mold is closed by the platen the excess volume of the pre-form extrudes out around the peripheral edge of the mold before activation of the blowing and cross-linking agents. The mold is heated, preferably pre-heated, to heat the pre-form above the decomposition and initiation temperatures of the agents. Decomposition of the blowing agent generates a system of incipient gas bubbles throughout the polymer and after the molded product is cooled and removed from the mold, the incipient gas bubbles are expanded by heating while the product is unconfined.

9 Claims, 1 Drawing Sheet

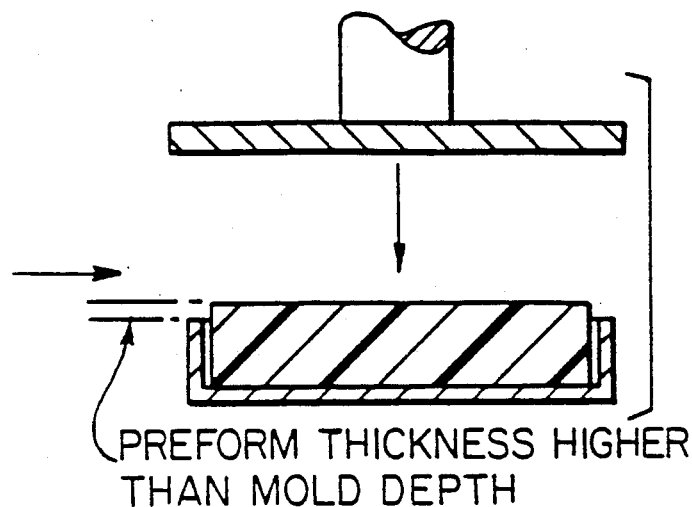

PREFORM THICKNESS HIGHER THAN MOLD DEPTH

FIG. 1

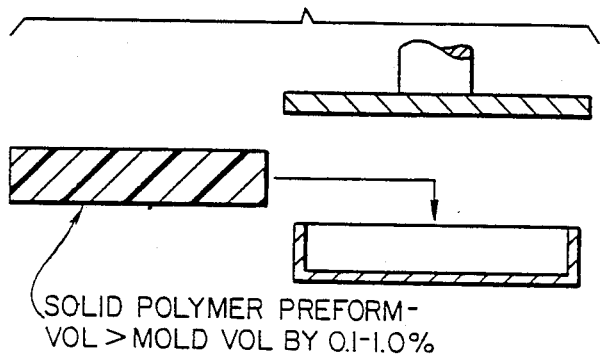

SOLID POLYMER PREFORM-
VOL > MOLD VOL BY 0.1-1.0%

FIG. 2

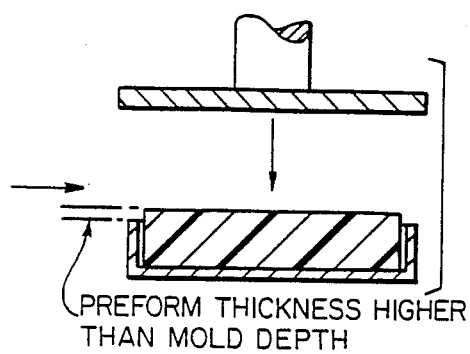

PREFORM THICKNESS HIGHER THAN MOLD DEPTH

FIG. 3

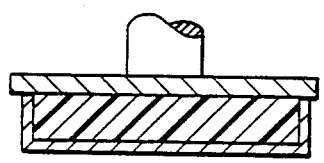

F = 8,500-12,000 PSI/IN² MOLD AREA

FIG. 3a

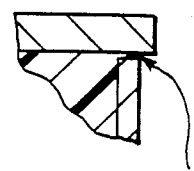

EXCESS POLYMER EXTRUDES AS FLASHING

FIG. 4

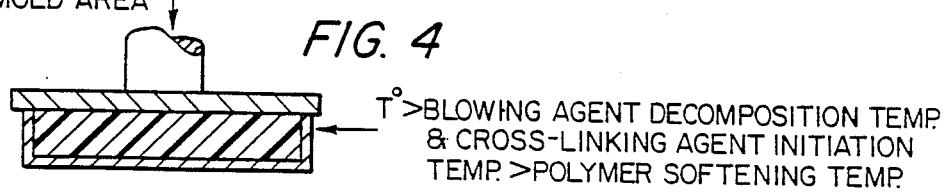

T° > BLOWING AGENT DECOMPOSITION TEMP. & CROSS-LINKING AGENT INITIATION TEMP. > POLYMER SOFTENING TEMP.

FIG. 5

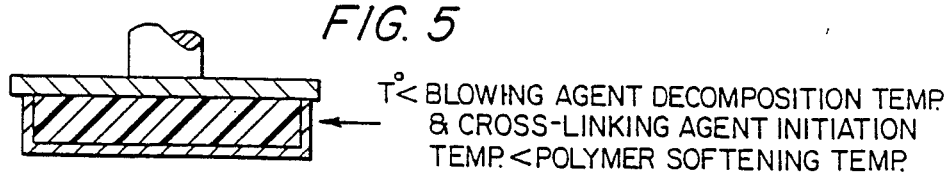

T° < BLOWING AGENT DECOMPOSITION TEMP. & CROSS-LINKING AGENT INITIATION TEMP. < POLYMER SOFTENING TEMP.

FIG. 6

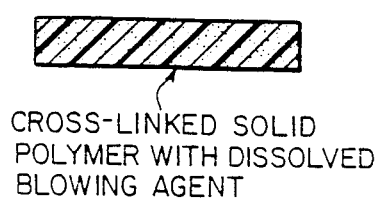

CROSS-LINKED SOLID POLYMER WITH DISSOLVED BLOWING AGENT

→ HEAT →

FIG. 7

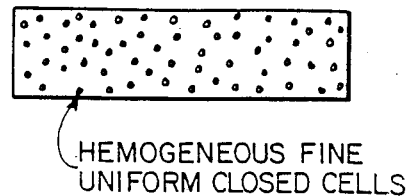

HEMOGENEOUS FINE UNIFORM CLOSED CELLS

MOLDING METHOD FOR PRODUCING EXPANDED POLYOLEFIN FOAM

FIELD OF THE INVENTION:

This invention relates to the production of uniform fine closed cell polyolefin resin foams by molding and is concerned more particularly with a method of this type which is carried out in two basic stages including a first stage in which a resin composition containing a heat-decomposed blowing agent and a heat-activated cross-linking agent is heated within a closed mold to a temperature high enough to activate these agents while expansion is prevented by loading the mold with a controlled high pressure, and a second stage in which the resultant heat treated but substantially unexpanded product is removed from the mold after cooling below its melt temperature and then heated to cause free expansion of gas bubbles released therein by the decomposition of the blowing agent.

BACKGROUND OF THE INVENTION:

The production of rubber foams, natural or synthetic, by such methods as described above has been carried out for a considerable time and has now reached a well developed state. An early example is U.S. Pat. No. 2,291,213 in which rubber stock compounded from a mixture of uncured rubber, a heat-activated gas generating compound, and the usual vulcanizing ingredients is placed in a mold to substantially fill the same and heated sufficiently to liberate the gas within the rubber stock and at least partially cure the rubber while being restrained against expansion by mechanical pressure applied from e.g. A platen. The mold is then opened to permit removal and expansion of the semi-cured stock after which vulcanization is completed as usual, with or without additional expansion, giving a closed cell rubber foam.

It is desirable to produce similar expanded foam products from synthetic thermoplastic polymers such as polyolefin polymers and especially polymers and copolymers of ethylene and vinyl acetate but the processing of such synthetic polymers has proved significantly more difficult than for rubber because they tend to be much softer than rubber and thus become more fluid when heated. Various proposals have, nonetheless, been made in the art for producing expanded vinyl foams. In U.S. Pat. No. 2,525,965, a thermoplastic resin such as a vinyl resin plastisol admixed with finely divided blowing agent is heated in a mold which it fills substantially completely under a starting low pressure, e.g. about 800 pounds per square inch of mold area, to a temperature to effect sufficient decomposition of the blowing agent as to cause up to 15% by volume of the mold charge to escape between the mold parts and form an irregular mass, after which the mold pressure was increased enough to prevent further escape, e.g. to about 4,000 p.s.i., and heating continued to complete decomposition of the blowing agent. After cooling, mold pressure was released and the molded product removed and heated, e.g. in hot water, to expand its volume.

According to U.S. Pat. No. 3,098,832, polyolefin resins blended with a heat-decomposable solid blowing agent and a heat-initiated organic peroxide cross-linking agent for the resin is placed within a confined zone in an amount occupying the entire space thereof, the zone preventing expansion, and heated to a temperature sufficient to effect at least partial cross-linking of the resin and decomposition of the blowing agent with entrapment of the gases released therefrom, the treated material being then cooled below about 150° F., removed from the confined zone and heated in the range of 260°–350° F. or above its softening point to expand the entrapped gases. Alternatively, cross-linking can be carried out in a separate radiation step.

In some known processes, the molding composition is allowed to undergo expansion as the blowing agent is decomposed and in U.S. Pat. No. 3,812,225, partial expansion within the mold is carried out. Here, a polyolefin resin homogeneously mixed with an organic peroxide cross-linking agent and a heat-decomposable blowing agent is molded into a slab-like pre-form without decomposing the blowing agent and the pre-form is subjected in a confined zone to an external pressure by an inert gas, such as nitrogen or a platen of about 5–50 kg/cm$^2$ and low enough to permit partial expansion thereof in the order of 5–30% of the ultimate expansion while being heated to decomposition temperature to initiate cross-linking. The heating temperature is then reduced while pressure is maintained, then such pressure is reduced to a lower level while the temperature is increased above the softening point of the material to permit expansion to reach its ultimate level.

Multi-stage expansion during a foaming process for a polyolefin resin is also shown in U.S. Pat. No. 4,671,910 wherein the basic molding composition, containing usually 10–25 parts per 100 pt resin is heated in a closed mold to selectively initiate the cross-linking reaction while substantially avoiding any decomposition of the blowing agent, then placed between two spaced-apart metal plates and heated to produce partial decomposition of the blowing agent with consequential lateral expansion between the fixed plates, after which the partially expanded product is placed under atmospheric pressure and heated to complete the decomposition of the blowing agent with free expansion thereof in all directions.

Utilization of an expandable mold for processing such an expandable composition is shown in U.S. Pat. No. 3,818,086. Here, a heat expandable olefin resin composition is placed in a gas tight mold to fill the same to 95–100% of its capacity, and heated to cause blowing agent decomposition and peroxide cross-linking under an initial pressure which is immediately released to increase mold volune 3–35 times within not more than 20 seconds and permit expansion of the composition, after which the expanded molding is cooled and removed.

In-situ expansion of the molding composition within the mold is likewise taught in U.S. Pat. No. 4,559,190 wherein polyethylene or similar resin is homogeneously mixed while molten with 0.1–2% by wt of a cross-linking agent 2–25% by wt of a blowing agent, each having a decomposition temperature higher than the polymer melt temperature, the homogeneous mixture is extruded or molded into a slab-like pre-form and the pre-form is placed within an over-sized air-tight closed container. The container is pressurize with an inert gas to a pressure of 40–70 bar (equal to about 600–1,000 p.s.i.) and heated above the decomposition temperature of the cross-linking and blowing agents for 20–45 minutes with not more than 5% expansion of the preform. The container is then depressurized for a short time with free expansion of the molded product to a volume smaller than the oversized container.

In processes of this type, expansion of the product after heat treatment within a confined mold to effect decomposition of the blowing agent, can also occur spontaneously when the mold is opened and pressure on the product is released, generally as a result of an increased level of blowing agent. Thus in U.S. Pat. No. 4,338,271 an ethylene-vinyl acetate copolymer containing greatly increased amounts of blowing or foaming agent in the order of 20-80 parts per 100 parts of copolymer plus 1-5 parts cross-linking agent after heating in a mold, which it fills to substantially full capacity, under pressure or around 150 kc/cm$^2$ (2130 p.s.i.), and temperature above the decomposition temperature of the blowing agent will, after cooling and opening of the mold, undergo spontaneous expansion to an extent 15-50 times mold volume, thereby "popping out" of the mold. Expandable rubber compositions behave similarly as shown in U.S. Pat. No. 4,596,684 where natural or synthetic rubber, optionally containing 10-60 parts by weight of a thermoplastic resin, mixed with 10-80 parts of foaming agent per 100 parts rubber and 0.5-15 percent by cross-linking agent when filled to substantial capacity of the mold and heated to its foaming temperature under pressure in the range of 100-200 kg/cm$^2$ (1422-2845 p.s.i.) will when the mold is opened, "abruptly pop out" of the mold, while undergoing large expansion of at least 15 times mold volume.

Despite efforts in the art as illustrated by the above disclosures, the production of high-quality expanded polyolefin resin foams with desirable uniform fine closed cell porous structure in an efficient fashion with minimal waste has been difficult to achieve in practice, and remains a desirable goal in the field. Control of the size of the charge to the mold is one important factor. Exact correspondence between the charge volume and the mold volume is virtually out of the question, especially where the charge is in the form of a pre-shaped solid slab or pre-form. If the mold is underfilled, clearance spaces are present which either serve to collect expansion gas when the same is generated and cause surface defects or permit localized expansion of the contiguous mold material resulting in the creation of large size gas bubbles in these regions. On the other hand, if the mold is overfilled and the excess charge is allowed to squeeze out after the mold is closed and decomposition of the blowing agent and release of the blowing gas has begun, this relieves the excess pressure in the regions proximate to the edges of the mold with differential expansion of the gas bubbles there. Also, cross-linking of the resin tends to occur first adjacent the outside surfaces of the charge, the heat from the heated mold naturally penetrating from the outside to the inside of the charge. Hence, cross-linking occurs preferentially at the outside of the charge and the interior material is necessarily the last material to undergo cross-linking. The melt temperature of the resin must be below the cross-linking initiation temperature and the resin thus melts before undergoing cross-linking, with the interior material being the last to melt. As gas generation and cross-linking proceed, the gas bubbles tend to migrate into the regions which remain fluid, again yielding non-uniform bubbles in the expanded foam. Moreover, if the mold is allowed to open even slightly after gas generation has begun, a delicate control is required to avoid unmanageable escape or spewing of the molten charge from the mold opening.

OBJECTS OF THE INVENTION:

The basic object of the invention is a method of producing high quality uniform fine closed cell expanded foams of polyolefin polymers in an efficient manner with minimum waste, using a high pressure molding step.

Another object is an expanded foam production method from a solid molding composition containing a polyolefin polymer and a heat-decomposable finely divided solid blowing agent which method includes heat treatment of the composition in a mold above the melt temperature of the polymer and the decomposition temperature of the blowing agent wherein complete filling of the mold needed for uniform foam cells is achieved while the molding composition is substantially solid and before decomposition begins.

A further object is foam production method of the above type in which the cavity of a mold having a platen closure is loaded with a solid pre-form of the molding composition having a thickness greater than the depty of such cavity and a solid volume exceeding the mold volume by 0.1-1% by volume whereby closure of the platen compresses the pre-form to completely fill the cavity and extrudes the excess pre-form material as a flashing projecting from the compressed pre-form between the mold cavity and platen.

A still further object is a foam production method of the type in question in which the heat-treatment to decompose the blowing agent throughout the molding composition is carried out under a high pressure in the range of about 8500-12000 pounds per in$^2$ of mold cross-sectional area and preventing any expansion of the composition while the agent undergoes decomposition into incipient gas bubbles, and after cooling and removal from the mold, the heat-treated product is re-heated to expand such gas bubbles.

The realization by the invention of these and other objects will be explained by the following detailed description.

When read in the light of the accompanying drawings which show in diagrammatic or schematic fashion the various operational steps that make up the process of the present invention.

According to FIG. 1, a solid polymer pre-form is placed within the cavity of a mold of fixed volume. The pre-form has homogeneously dispersed therethrough particles of a cross-linking agent for the polymer in question together with a blowing agent therefor. The volume of the pre-form exceeds the fixed volume of the mold cavity by a controlled amount of about 0.1-1.0%.

In FIG. 2, the pre-form is located within the mold ready for closure of the platen thereof. The height of the pre-form exceeds the depth of the mold cavity so that the pre-form projects somewhat above the top plane of the mold. The pre-form fits within the area of the mold, the clearance therebetween as well as the extent of the pre-form above the mold being somewhat exaggerated for clarity.

In FIG. 3, the platen has been lowered to close the mold, as seen more clearly in an enlarged detail view FIG. 3a of a top corner of the mold, the excess volume of the pre-form is squeezed or extruded laterally to form a flashing between the upper end of the mold and the contiguous annulus of the mold platen.

As indicated in FIG. 4, pressure is applied to the mold in the range of 8,500-12,000 psi per square inch of mold area, and the mold is heated to a temperature (T°C) which is higher than the cross-linking initiation temperature of the cross-linking agent and the decomposition temperature of the blowing agent both of which are also higher than the polymer softening temperature.

After the pre-form is heated within the mold to a sufficient degree to initiate cross-linking and at least partial activation of the blowing agent, the mold temperature is reduced below the softening temperature for removal of the pre-form therefrom, as indicated in FIG. 5.

The removed cooled pre-form appears in FIG. 6 and contains the activated blowing agent dissolved therethrough in the form of incipient gas bubbles.

Finally, the removed pre-form is heated which results as shown in FIG. 7 in a fully expanded cross-linked form having homogeneous fine uniform closed cells therethrough.

DETAILED DESCRIPTION OF THE INVENTION:

As illustrated by the prior art summarized above, heat-foamable, resin-based molding compositions are generally well known in the field; and broadly speaking, the present compositions resemble those used previously. The basic resin or polymeric component, which serves as the matrix of the ultimate foamed product is a resilient cross-linkable polyolefin resin, especially polyethylene, specifically low density polyethylene, ethylene/vinylacetate, mixtures of the same, and similar polymers. Typical useful polymers and their sources are listed below:

| Manufacturer | Brand Name | Type of Polymer |
| --- | --- | --- |
| U.S.I. | NA 233 | polyethylene |
| Dow Chemical | Resin 640 | polyethylene |
| DuPont | Alathon 1645 | polyethylene |
| U.S.I. | U.E. 630 | ethylene vinyl acetate |
| DuPont | Elvax 460 | ethylene vinyl acetate |

To the basic resin are added two active ingredients, the first being a chemical blowing agent in a finely divided solid form which when subjected to heat of high enough temperature decomposes to release a gas. The amount of blowing agent is in the range of about 10-15 parts per 100 parts of resin. Decomposition should take place between about 280°-360° F., preferably 300°-320° F. As is known, e.g., from U.S. Pat. No. 3,098,832, the blowing agent can be activated by mixing with an activator therefor mainly in order to regulate its decomposition temperature and/or decomposition rate. More precise control over the blowing action is possible by combining an activated type of agent with an unactivated type, and this is the preferred practice here. Typical suitable blowing agents and their sources are as follows:

| Manufacturer | Brand Name | Type |
| --- | --- | --- |
| Uniroyal Chemical | Celogen AZ-130 | Azodicarbonamide |
| Nor-Am Chemical | Ficel AC3 F | Azodicarbonamide |
| Olin | Kempore 125 | Azodicarbonamide |
| Mobay | Porafor ADC/M | Azodicarbonamide |
| Uniroyal Chemical | Celogen 754 | Activated Azocarbonamide |
| Nor-Am Chemical | Ficel L.E. | Activated Azocarbonamide |
| Mobay | Porafor KL3-2014/1 | Activated Azocarbonamide |

The active ingredient is a cross-linking agent for the resin which is an organic peroxide, such as a dialkyl peroxide, illustrated by dicumyl peroxide, and should be present in the range of about 0.2–1 parts per 100 parts resin. The cross-linking reaction should be initiated likewise in the general range of 280°–360° F. but need not correspond exactly with the decomposition temperature of the blowing agent. A half-life of not more than about 5 minutes at curing temperature is a useful property for the per-oxy cross-linking agent to insure a sufficient rate of reaction. The reactions of the blowing and cross-linking agents do overlap, but it is not necessary for their reaction rates to be synchronized with one another inasmuch as the mold is fully closed and the molding compositions completely confined before either of them reaches activation temperature. Examples of effective cross-linking agents include:

| Manufacturer | Brand Name | Type |
| --- | --- | --- |
| Lucidol | Lupersol 230 | Peroxyketal |
| Lucidol | Luperox 500 | Dialkyl |
| Hercules | Di-Cup | Dialkyl |

The molding compositions include other ingredients which are in principle optional but are normally employed in practice to give good performance. First is a lubricant processing aid such as a metal salt of a long chain fatty acid, a solid long chain fatty acid itself, or the like. Such a material facilitates the mixing or blending operation and promotes easy release of the reacted product from the mold where the active reactions occur. Specific workable aids include stearic acid, zinc stearate, calcium stearate and so on.

Next, a finely divided solid filler is a valuable additive to serve as nucleation sites for gas bubble or cell development. A useful particle size is in the range of about 1–10 micron, and a useful content is in the range of about 2–10 parts per 100 parts resin. A preferred filler is calcium carbonate, exemplified by the following, but various of the inert pigment-like solids could be substituted:

| Manufacturer | Brand Name | Type |
| --- | --- | --- |
| Thompson, Weissman | Atomite | Calcium Carbonate |
| H. M. Royal | Camel-Wite | Calcium Carbonate |
| Georgia Marble | Calwhite | Calcium Carbonate |

The optional additives of known types, such as colorants, anti-oxidants, anti-static agents, etc., can, of course, be included in minor amounts appropriate for their purpose.

An essential feature of the invention is the observance of a precise relationship between the volume amount of the molding composition loaded into the mold and the actual volume of the mold, whereby the charge volume exceeds the mold volume by a controlled amount in the range of 0.1–1 percent. In order for this condition to be realized, the molding composition must be manipulated in advance into a solid slab-like charge or pre-form. As received, the resin is in the form of small pellets; and in order to shape the same into the pre-form, they are heated to a temperature above at least the softening temperature of the resin and while at such temperature, compounded with the other ingredients of the molding composition, especially the blowing agent and cross-linking agent into a homogeneous mixture. The activation temperature of these active ingredients is higher than the softening temperature of the resin so that mixing of the resin while in softened condition does not result in premature activation thereof. Generally, a temperature of about 220°–260° F., preferably about 220°–230° F., will suffice for softening of the resin and compounding of the overall composition, the activation temperature for the two active ingredients being, of course, above this range. For example, at 220° F. polyethylene is in semi-plastic condition and readily amenable to blending with other ingredients. The compounding can take place in a suitable mixer such as a Banbury mixer, followed if preferred by further mixing carried out on a conventional rubber mill, the result in any case being a homogeneous mixture. With the resin pellets in softened condition by heating at the above specified temperature, it has been found that the resin beads fuse readily and smoothly into solid body with no detectable lines of demarcation representing their original beaded structure. Consequently, after being adequately and homogeneously mixed and blended, the molding composition can be delivered to an extruder or other shaping device and extruded thereby into a generally flat slab-like structure which can have well-defined dimensions. From this extruded slab can be severed a precisely limited section having dimensions which are correlated with the dimensions of the mold so that the separated section, which constitutes the pre-form, has a cross-sectional area fitting easily with a small clearance within the mold cavity. It will be understood, however, that the thickness of the extruded slab must exceed the thickness of the mold cavity and that the actual volume of the pre-form separated from the slab must exceed the actual volume of the mold cavity by an amount within the above-specified range.

After its formation, the pre-form is a dense solid slab-like body which, while retaining the basic resiliency of the polymer, is sufficiently hard that it does not yield easily, if at all, under finger pressure and would require measurement as to hardness by means of a durometer or like instrument.

A typical density in the pre-form state is about 60–62 lbs/ft$^3$.

To commence the molding operation, the pre-form as just described is placed into the mold after the top closure, i.e., platen, thereof has been opened to expose the mold cavity. That cavity will ordinarily have a uniform depth or thickness defined by its bottom wall and the platen surface when the latter is in closed position. However, more complex shapes are possible assuming that the pre-form can be shaped to essentially correspond therewith and maintain a consistent or uniform projection above the top level of the mold cavity.

The mold is equipped with lateral or side flanges extending at right angles to the sides of the mold cavity around the top edge thereof, and these flanges can be either flat or provided with shallow grooves as preferred. The platen has a continuous surface overlying the mold cavity to close the same and projecting laterally in overlapping relation with the side flanges of the mold cavity. The platen is supported for generally vertical movement and when brought to closed position, applies a compressive force to the upwardly projecting top surface of the pre-form when situated within the mold cavity.

In the interest of an increased production rate and high operational efficiency, the mold is preferably pre-heated to the molding temperature prior to introduction of the pre-form therein. The pre-form itself is ordinarily not pre-heated or, if pre-heated, is maintained well below its melt temperature to avoid premature softening when placed within the mold. Obviously, pre-heating the mold is not essential; it can, if preferred, be held during the mold loading stage at a lower temperature, i.e., at or around the temperature to which it is cooled before removal of the heat-treated pre-form, and then be heated to the higher molding temperature. In either case, the pre-foam, when compressed by the closing platen remains in solid condition, undergoing at most a slight softening while continuing well below its actual softening temperature. The platen is moved quickly to close the mold, the entire mold loading and closing operation taking about one minute. Consequently, the platen causes the controlled excess volume of the pre-form to be squeezed out or extruded laterally between the now proximate side flanges of the mold cavity and the overlapping margins of the platen as a "flashing" around the upper edge of the compressed pre-form. In this manner, the remainder of the pre-form totally occupies the entire volume of the closed mold, the extruded flashing constituting the only waste of the process. Although this extruded flashing is initially solid, it melts rapidly and serves the beneficial purpose of assuring an effective seal between the mold flanges and the platen margins to prevent any escape of the gas generated by decomposition of the blowing agent.

The molding temperature, to which the mold cavity and platen are heated, or pre-heated, as the case may be, depends somewhat on the temperatures at which the blowing agent and cross-linking agent, respectively, are activated but will ordinarily fall within the range of 280°–360° F., and usually 300°–320° F. The molding pressure is controlled at a critical high pressure of about 8000–12000 lbs/in$^2$ of the mold cross-sectional area. This pressure is applied mechanically to the mold platen after the latter is in its closed position, as by way of a hydraulically driven piston or ram of sufficiently large diameter as to create the total force needed to achieve the molding pressure specified above from the available level of hydraulic pressure. For example, with a factory hydraulic system available at a pressure of 2250 psi, a piston of 48 inch diameter would provide a total pressure of more than 4,000,000 lbs which is sufficient to create the necessarily minimum pressure for a mold having an effective cross-sectional area of up to about 500 in$^2$. Usually the mold cavity is of simple rectangular shape, such as 30"×16" giving an area of 480 in$^2$ and an effective molding pressure of about 8500 psi, and has a uniform depth or thickness of, say, 1 to 1½, e.g., 1.2 in. The lower or body section of the mold defining the cavity is supported from beneath against the platen pressure and has sufficient mechanical strength in its side walls as to withstand collapse by such pressure.

The selected molding temperature and pressure are maintained for a time sufficient to achieve virtually complete, e.g., 100% decomposition of the solid blowing agent as well as at least substantially complete reaction of the cross-linking agent, e.g., 90–100%. The actual elapsed time will accordingly vary with different combinations of active constituents and their individual activation rates but as a rule will vary in the range of about 15–30 minutes. Longer times are certainly permissible but are less efficient. A typical time is 18–20 minutes.

After the heat treatment stage is complete, the mold is cooled to below the softening temperature of polymer preparatory to opening of the mold platen and removal of the reacted pre-form from the mold cavity. Such cooling is preferably forced by means of a cooling medium circulated around the mold to minimize delay and speed up production but is not necessary. Cooling can proceed to room temperature if desired, but any temperature at which the product is well below its softening temperature and can be handled in reasonable comfort is quite acceptable and may reduce the time for re-heating the mold.

In contrast to the experience of several prior art foaming techniques, the reacted pre-form of the invention upon being released from the mold cavity undergoes at most only a slight degree of spontaneous expansion, e.g., up to 10–20% by volume, and may even remain unexpanded, dependent upon the polymer employed. This is advantageous because spontaneous expansion is harder to control in reproducible fashion than the post-heat expansion step of the invention. For expansion here, the reacted pre-form is placed in a heated environment, such as oversized or open oven, where it is free to expand in all directions and heated to a temperature above its softening point generally in the range of 230°–270° F. until it has undergone the desired degree of expansion, usually in the order of about 15–20 times the mold cavity volume which may take 30–60 minutes. Some shrinkage may occur when the expanded product cools to room temperature. The final density of the expanded foam is ordinarily around 3–6 lbs/ft$^3$, and an average value is about 4 lbs/ft$^3$. Since the blowing effectiveness of the various blowing agents, or combinations of them, may differ somewhat, the amount of the blowing agent may require some adjustment in practice and, of course, that amount can be changed to alter the final density of the foamed product to the desired level.

The expanded foam products produced in this method are characterized by a fine uniform cellular structure of high quality and are free of defects either as voids or irregularities on their exterior or non-uniform cells or discontinuities within their interior.

In order to increase operational efficiency and maximize production output, it is preferred that a plurality of molds, each consisting of a mold body providing the cavity and an individual platen, be arranged in a vertical stack one on top of the other for pressurization by the piston of a common press. In such an arrangement, pressure is transmitted by the body of one mold to the platen of the next upper mold with good efficiency.

What is claimed is:

1. A method of making a low density polyolefin resin foam utilizing a mold having a molding cavity of fixed volume determined by a fixed cross-sectional area and a defined substantially uniform thickness which is open at its top throughout said area and is adapted to be closed by means of an openable platen overlapping around its margins with the ends of the side walls of said cavity, which method comprises the steps of forming into a solid resilient pre-form a molding composition consisting essentially of a polyolefin resin selected from the group consisting of polyethylene, co-polyethylene/vinyl acetate, and mixtures thereof, and homogeneously distributed through said resin finely divided particles of a solid blowing agent in the amount of 10–15 parts per 100 parts resin in a peroxy-cross-linking agent for said resin in an amount at least substantially sufficient to cross-link the same, said blowing agent undergoing decomposition and releasing a gas when heated above its decomposition temperature and said cross-linking agent undergoing a cross-linking reaction with said polyolefin resin when heated above an initiating temperature, each said temperature being within the range of about 225° F.–400° F. and higher than the softening temperature of said resin, said pre-form having a cross-sectional area fitting within the mold cavity area, a thickness in excess of said defined mold thickness, and a solid volume exceeding the fixed mold cavity volume by 0.1–1.0 percent; placing said solid pre-form in said mold cavity while said platen is open and then closing said platen to close said cavity and thereby compress the solid pre-form to the thickness of said cavity, the excess volume of said pre-form extruding laterally between the ends of the cavity side walls and platen margins around said cavity as a flashing; after closure of the mold applying an external pressure to said platen in the range of about 8,500–12,000 pounds per square inch of the mold cross-sectional area while heating said pre-form to a temperature higher than said decomposition and initiation temperatures for a time sufficient to soften said resin and essentially decompose said blowing agent and generate incipient gas bubbles in said softened resin and at least initiate said cross-linking reaction while said pre-form remains in said closed mold; without releasing said pressure cooling the closed mold to below the softening temperature of said resin; opening the closed mold and removing the cooled molded product therefrom; and finally heating the removed product to a temperature to expand the incipient gas bubbles therein and complete the cross-linking reaction thereof, to give a foamed product with fine substantially uniform closed cells distributed homogeneously therethrough.

2. The method of claim 1 wherein said peroxy cross-linking agent is present in said molding composition in the amount of about 0.2–1 parts per 100 parts resin.

3. The method of claim 1 wherein said composition within the mold is heated to a temperature of at least 300° F.

4. The method of claim 1 wherein said molding composition includes a finely divided filler in an amount of about 2–10 parts per 100 parts resin.

5. The method of claim 4 wherein said finely divided filler has a particle size in the range of about 1–10 microns.

6. The method of claim 1 wherein said cooled molded product is expanded by heating to a temperature above the polymer softening temperature.

7. The method of claim 1 wherein said mold cavity and platen have opposed generally flat surfaces extending laterally around the mold opening and the excess volume of said pre-form upon closure of the platen extrudes between said opposed surfaces to form a seal therebetween.

8. The method of claim 1 wherein said mold is preheated to said temperature higher than said decomposition and initiation temperatures prior to introduction of the preform therein.

9. The method of claim 1 wherein a plurality of said molds, each with its own platen, is arranged in a vertical stack and the molding pressure is applied to the opposite ends of the stack for transmission from one mold to the other throughout the height of the stack.

* * * * *